April 8, 1941. F. MARASSO 2,237,528
CONTAINER COVER OPERATING MECHANISM
Filed Feb. 3, 1938
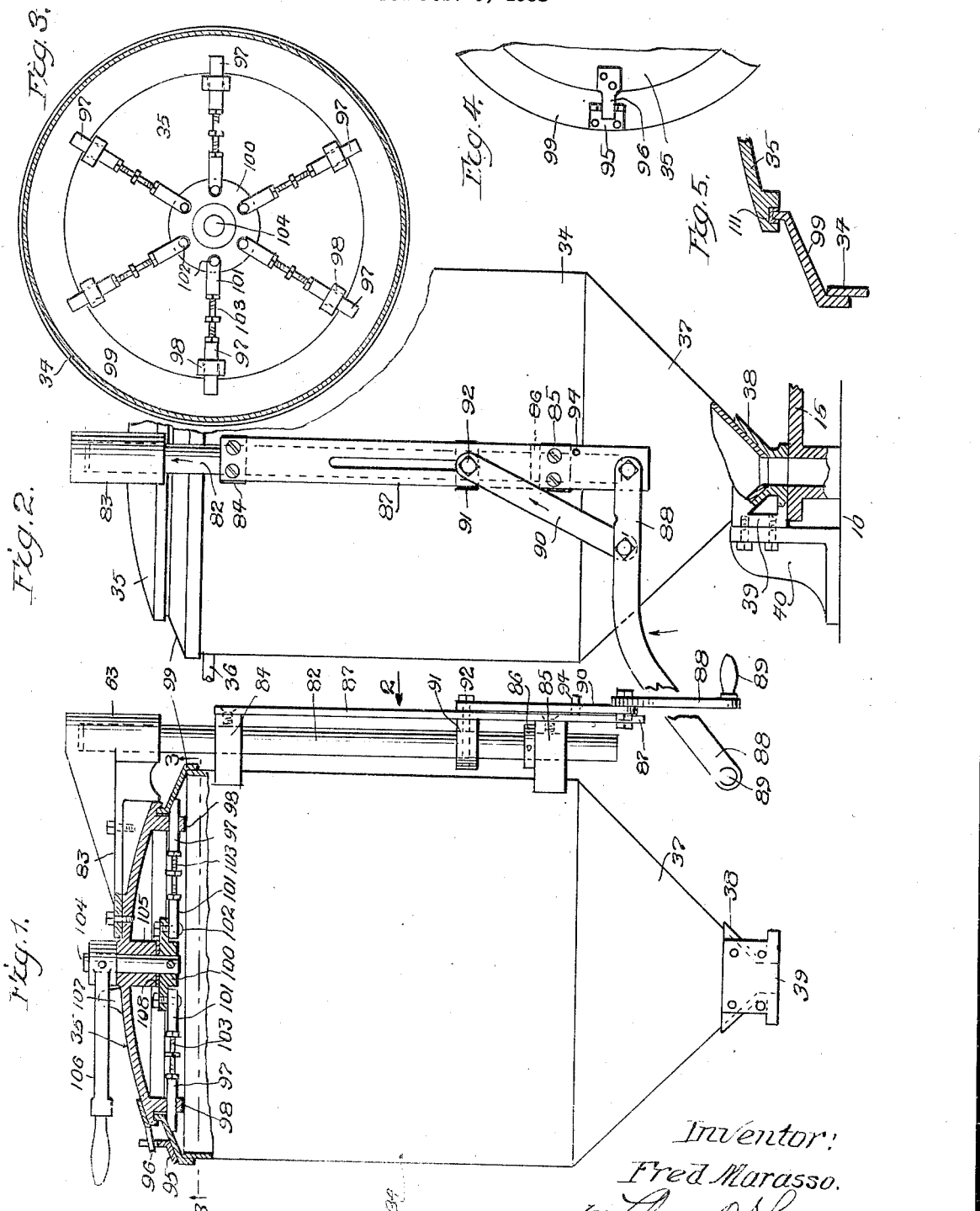
Inventor:
Fred Marasso.

Patented Apr. 8, 1941

2,237,528

UNITED STATES PATENT OFFICE 2,237,528

CONTAINER COVER OPERATING MECHANISM

Fred Marasso, Joliet, Ill., assignor to Union Machinery Company, Joliet, Ill., a corporation of Illinois Application February 3, 1938, Serial No. 188,406

3 Claims. (Cl. 220—47)

This invention relates to container cover operating mechanism and the subject matter thereof is a continuation in part of my application for patent on Combined dividers and rounders, Serial No. 150,566, filed June 26, 1937, now Letters Patent No. 2,119,018.

In bakers' machinery, such as dough dividers and combined dividers and rounders, a container or tank is employed for holding a batch of dough which is to be divided into small lumps of predetermined size and weight, and with certain types of dividers, air pressure is applied to the dough in the tank to feed the dough to the dividing mechanism, and in such cases the container is provided with a closure or cover which must have an air tight joint with the container to prevent leakage of air. These covers are heavy and somewhat difficult to handle by hand.

Among the objects of this invention is the provision of simple and easily manipulated mechanism for raising the cover above the container, whereby it may be swung to the side of the container, and free access may be had to the open top thereof for the purpose of placing a batch of dough therein and for the purpose of cleaning the container.

Another object is the provision of simple and easily manipulated cover locking mechanism, whereby the cover may be locked down tight on the container against the leakage of air when the pressure is applied to the dough contained in the container.

Other objects and advantages will appear in the course of this specification and, with all of said objects and advantages in view, this invention consists in the several novel features of construction, arrangement and combination of parts, hereinafter more fully described and claimed.

The invention is clearly illustrated in the accompanying drawing, in which:

Fig. 1 is a side elevation, partly broken out of a container and cover, illustrating one form of the present cover operating mechanism.

Fig. 2 is a side elevation thereof partly broken away and looking in the direction of the arrow 2 in Fig. 1.

Fig. 3 is a horizontal section taken on the line 3—3 of Fig. 1.

Fig. 4 is a fragmental plan of the cover illustrating a centering device.

Fig. 5 is an enlarged, detail, vertical section taken at the joint between the container and cover.

In the embodiment of the invention illustrated, the reference character 34 illustrates a container or tank for holding a batch of dough, and 35 designates a cover or closure for the open top thereof. The lower end of the container is desirably in the form of a hopper 37, to the open lower end of which is secured a flaring collar 38 which surrounds the extreme lower end of the hopper, and in the form illustrated, the collar is formed with a bracket 39 supported upon a standard 40, which in accordance with the disclosure of my said prior application, is secured to a platform 10 of the divider. The container may, however, be supported by any suitable bracket to adapt it to any particular machine. The lower end of the collar may make close contact with the rotating table 15 of a divider or other machine, or a feed pipe (not shown) may lead down from the collar to the divider table. An air supply pipe 36 leads from the upper end of the container to a source of air under pressure. The cover operating mechanism will now be described:

As shown, the cover 35 is dome-shaped and is carried by upright rod 82, the upper end of which enters a socket in an arm 83, which is rigidly fastened to the top of the cover. The rod extends down along the side of the container and is slidably held in lugs 84, 85 that are secured to and project from the side of the container. A collar 86 fast on the rod 82 rests on the lug 85, and normally supports the rod thereon. A slight clearance between the top of the rod and the end of the socket, permits the cover to seat perfectly on the top of the container in the down position of the rod. Bolted or otherwise fastened to said lugs is an upright slotted bar 87, upon the lower end of which is fulcrumed a lever 88, having a handle 89 on its free end. Connecting the lever with the rod is a link 90 whereby the rod, and therewith the cover, may be raised or lowered. The connection between the upper end of the link and rod comprises a collar 91 on the rod, and a bolt 92 which extends through the upper end of the link, through the slot in the bar 87 and through the collar 91 and rod 82.

Normally the cover rests upon the container and the rod is supported by the lug 85. To uncover the container, the lever 88 is swung upward, thereby raising the link 90 and rod 82 and therewith the arm 83 and cover 35. If desired, a stop 94 may be provided on the bar 87 in position to hold the lever in its raised position. When raised, the cover may be swung to one side of the container, whereby a batch of dough may be deposited into it from above. To close the cover, it is swung back over the container and the lever 88, lowered to its normal position. In order to center the cover on the container, a forked centering member 95 is fastened to the top of the container and a finger 96 is fastened to the cover in position to center the cover when the finger enters the notch of the forked centering member 95.

To lock the cover tightly on the container, simple locking means has been provided. As shown, the means comprises a series of radially disposed lock bolts 97 which are guided in lugs 98 that project down from the cover adjacent its margin. The lugs are tapered along their upper outer ends and engage with the under side of a correspondingly tapered ring 99 which is welded or otherwise fastened to the upper end of the container wall. The bolts are connected to a rotatable disc 100 by links desirably comprising link members 101 pivotally connected with the disc by bolts 102 and threaded adjustment rods 103, having right and left threads engaging the bolts 97 and link members 101. The disc is rigidly secured to a stem 104 rotatively mounted in a hollow boss 105 formed on the cover. The stem protrudes from the upper side of the cover and has a handle 106 fastened upon it, by means of which the stem and discs may be partially rotated to withdraw and project the bolts. A stop 107 is positioned on the cover to limit the throw of the handle in the locked position of the bolts, whereby the pivotal connection between the links and disc may be moved past the dead center to positively lock the bolts in their projected position.

To unlock the cover, the handle 106 is turned away from the stop, thereby turning the disc and retracting the bolts from their engagement with the ring 99.

The lever 88 may then be swung up, thereby raising the cover above the top of the container and it may then be swung upon the rod 82 to a position at one side of the container.

To prevent air leakage through the clearance space between the stem 104 and the boss 105, a soft metal washer 108 is interposed between the boss and disc. A gasket 111 on the underside of the cover engages with an upturned rim of the ring 99 and makes an air tight joint between the container and cover.

I claim as new and desire to secure by Letters Patent:

1. In container cover operating mechanism, the combination of a container, a cover therefor, a cover carrying arm, a vertically movable supporting rod, upon which the arm is swivelly carried when the cover is in raised position, there being a limited amount of vertical movement of said rod with respect to the arm, whereby the cover may seat on the container, means to raise said rod and therewith the cover to raised position, and supporting means carried by the container for supporting the cover raising means.

2. In container cover operating mechanism, the combination of a container, a cover therefor, a cover carrying arm, a vertically movable non-rotatable supporting rod upon which the arm is swivelly carried when the cover is in raised position, means, carried by the container, for guiding the rod and supporting the same in its lowered position, there being a limited amount of movement of said rod with respect to the arm, whereby the cover may seat on the container, and means for raising and lowering the rod and therewith the cover.

3. The combination of a container for containing dough and compressed air and having an annular top member, a vertically movable and horizontally swingable cover arranged to rest upon and make a tight fit with said top member, a cover carrying arm, a rod upon which the arm and therewith the cover are swingably carried, said arm and rod having a limited amount of movement relative to each other in a vertical direction, whereby the cover may seat tightly on the top member of the container, means to clamp the cover on the container, guide members for said rod mounted on the container, rod raising and lowering means and means to support the rod in its lowermost position.

FRED MARASSO.